(12) United States Patent
Tanaka et al.

(10) Patent No.: US 7,993,737 B2
(45) Date of Patent: Aug. 9, 2011

(54) NATURAL FIBER-REINFORCED THERMOPLASTIC RESIN INJECTION MOLDING

(75) Inventors: Tatsuya Tanaka, Kobe (JP); Takayasu Fujiura, Kobe (JP); Naoki Kikuchi, Kobe (JP); Naoyuki Tashiro, Takasago (JP); Atsushi Yamamoto, Takasago (JP); Tsutomu Nagaoka, Takasago (JP); Kentaro Okuno, Sakai (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 12/745,144

(22) PCT Filed: Nov. 26, 2008

(86) PCT No.: PCT/JP2008/071367
§ 371 (c)(1),
(2), (4) Date: Sep. 14, 2010

(87) PCT Pub. No.: WO2009/069607
PCT Pub. Date: Jun. 4, 2009

(65) Prior Publication Data
US 2011/0001268 A1    Jan. 6, 2011

(30) Foreign Application Priority Data

Nov. 30, 2007 (JP) ................................ 2007-310855

(51) Int. Cl.
*B29C 45/00* (2006.01)

(52) U.S. Cl. ................ 428/292.4; 264/328.1; 428/297.4
(58) Field of Classification Search ............... 264/328.1; 428/292.4, 297.4, 332, 292.1, 35.7
See application file for complete search history.

(56) References Cited

U.S. PATENT DOCUMENTS

| 6,620,507 B2 | 9/2003 | Kadowaki et al. |
| 2007/0131478 A1* | 6/2007 | Okazaki et al. ............... 181/167 |
| 2009/0004453 A1 | 1/2009 | Murai et al. |

FOREIGN PATENT DOCUMENTS

| JP | 10 36650 | 2/1998 |
| JP | 2001 261844 | 9/2001 |
| JP | 2002 115173 | 4/2002 |
| JP | 2005 68371 | 3/2005 |
| JP | 2005 147303 | 6/2005 |
| WO | 2007 097436 | 8/2007 |

* cited by examiner

*Primary Examiner* — Jill L Heitbrink
(74) *Attorney, Agent, or Firm* — Oblon, Spivak, McClelland, Maier & Neustadt, L.L.P.

(57) ABSTRACT

The invention provides a natural fiber-reinforced thermoplastic resin injection molding having an excellent ability to discharge static electricity. The natural fiber-reinforced thermoplastic resin injection molding is obtained by injection-molding with using natural fiber-reinforced thermoplastic resin pellets as a molding feedstock containing natural fibers as reinforcing fibers, has a natural fiber content of from 20 to 60 wt %. The natural fibers have an average length of from 1.5 to 4.0 mm. The natural fiber-reinforced thermoplastic resin injection molding has an electrostatic voltage half-life, as determined by the half-life measurement method specified in JIS L 1094, of less than 40 seconds.

2 Claims, 1 Drawing Sheet

NATURAL FIBER-REINFORCED THERMOPLASTIC RESIN INJECTION MOLDING

TECHNICAL FIELD

The present invention relates to a natural fiber-reinforced thermoplastic resin injection molding containing natural fibers as reinforcing fibers and having an excellent ability to eliminate static buildup.

BACKGROUND ART

Thermoplastic resin injection moldings are moldings (molded articles) obtained by injection-molding thermoplastic resin pellets (a thermoplastic resin composition) as the molding feedstock. Because thermoplastic resin injection moldings are inexpensive, lightweight and have excellent manufacturability, they are widely used in automotive parts and various other types of consumer product part applications in the fields of, for example, electrical and electronic manufacturing, and packaging and containers. However, thermoplastic resin compositions generally have a high electrical resistance and tend to build up static electricity, as a result of which dust readily adheres to thermoplastic resin compositions. When static electricity is discharged from a thermoplastic resin composition, it may have an adverse impact on nearby equipment (such as causing the malfunction of electronic parts).

For this reason, the use of, as the molding feedstock, a thermoplastic resin composition in which conductive fibers such as metal fibers or a conductive filler such as carbon black has been included in order to keep static electricity from building up in a molding or to enable static electricity to be rapidly removed is known.

At the same time, in the field of plastics, as in various other industrial fields, out of concern for the global environment, efforts (such as the recycling of plastic resources and the recycling of PET bottles and automotive bumpers) are being made to reduce carbon dioxide emissions as a cause of warming. The use of natural fibers such as jute, kenaf and bamboo fibers as reinforcing fibers in plastics is attracting attention because such natural fibers can fix $CO_2$ and are capable of being compounded with resins.

Although fiber-reinforced thermoplastic resin pellets containing natural fibers as reinforcing fibers have been proposed (e.g., Patent Document 1), natural fiber-reinforced thermoplastic resin injection moldings which have an ability to discharge static electricity immediately are not yet known.

Patent Document 1: Japanese Patent Application Laid-open No. 2001-261844

DISCLOSURE OF THE INVENTION

It is therefore an object of the present invention to provide natural fiber-reinforced thermoplastic resin injection moldings, which are obtained by injection-molding with using natural fiber-reinforced thermoplastic resin pellets as the molding feedstock containing natural fibers as reinforcing fibers, and have an excellent ability to discharge static electricity.

The present invention provides the following technical means for achieving the above object.

The invention provides a natural fiber-reinforced thermoplastic resin injection molding which is obtained by injection-molding with using natural fiber-reinforced thermoplastic resin pellets as a molding feedstock containing natural fibers as reinforcing fibers. The molding has a natural fiber content of at least 20 wt % but not more than 60 wt %, and the natural fibers in the molding have an average length of at least 1.5 mm but not more than 4.0 mm. The molding has an electrostatic voltage half-life, as determined by the half-life measurement method specified in JIS L 1094, of less than 40 seconds.

This invention makes it possible to obtain natural fiber-reinforced thermoplastic resin injection moldings produced by injection-molding with using natural fiber-reinforced thermoplastic resin pellets as the molding feedstock containing natural fibers as the reinforcing fibers, which moldings have an excellent ability to discharge static electricity.

BEST MODE FOR CARRYING OUT THE INVENTION

Figure 1:
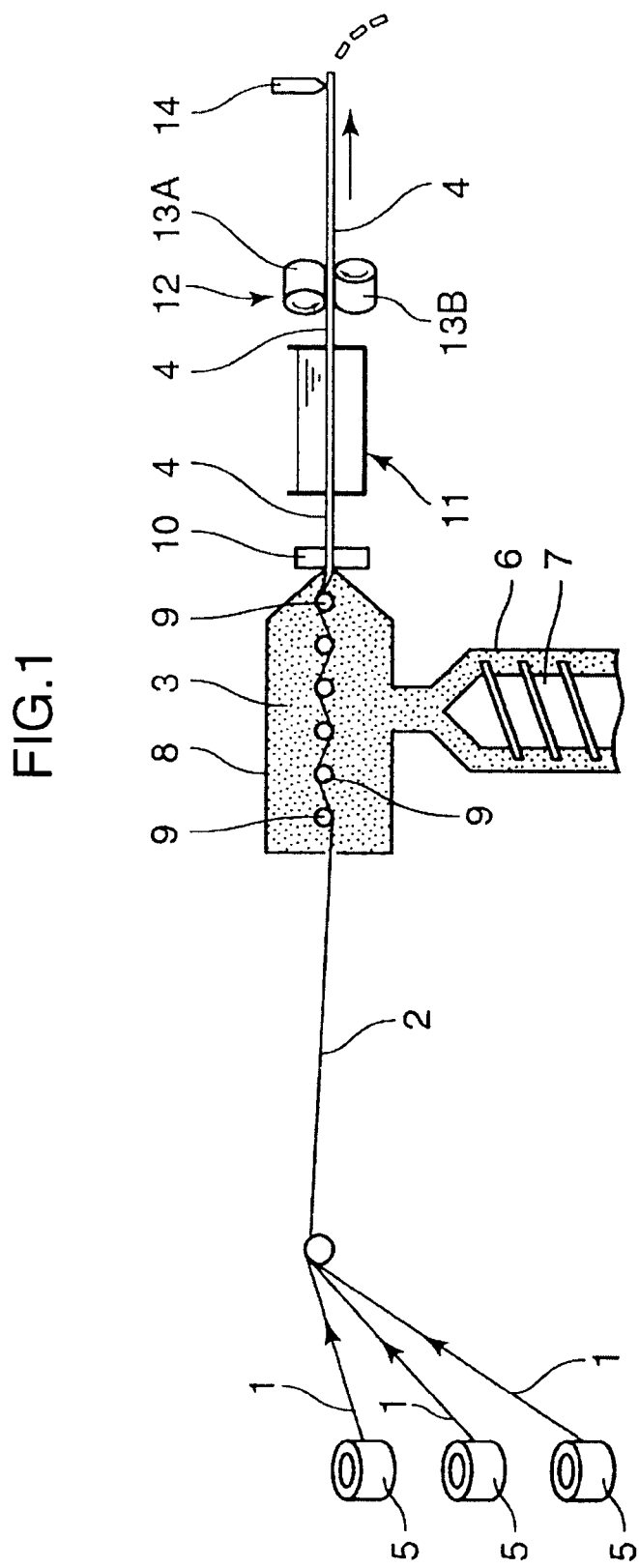
FIG. 1 is a schematic diagram showing an example of an apparatus for producing natural fiber-reinforced thermoplastic resin pellets according to the present invention by a pultrusion process.

Embodiments of the invention are described below while referring to the appended diagrams. The following embodiments serve as examples of the invention and are not intended to limit the technical scope thereof.

The mechanism by which the natural fiber-reinforced thermoplastic resin injection molding of the invention (also referred to below as simply the "natural fiber-reinforced resin injection molding") brings out a static electricity discharging ability is not clear. The main factors underlying the ability to bring out such a static electricity discharging ability are thought to be the conductive (charge transfer) effects due to functional group-containing compounds such as cellulose that are ingredients within the natural fibers present in the natural fiber-reinforced resin injection molding and the conductive effects due to moisture present in the natural fibers. These effects are presumed to bring out electrical conductivity (static buildup eliminating ability) throughout a molding because, instead of natural fibers being present as independent particles within the molding, such fibers having at least a given length are in mutual contact within the molding.

The natural fibers in the present invention are exemplified by hemp fibers (linen, ramie, manila hemp, sisal, jute, cannabis, kenaf, etc.), bamboo fibers (Moso bamboo, Japanese bamboo, etc.), ramie, coconut fibers, cotton, kapok, palm fibers, rice straw, wheat straw and pineapple fibers. These may be used singly or, if necessary, a plurality of types may be suitably used in combination.

Out of the above-mentioned natural fibers, from the standpoint of ready availability, stability of supply and cost competitiveness, hemp fibers and bamboo fibers are especially preferred.

The type of thermoplastic resin used as the matrix resin according to the present invention is not subject to any particular limitation, provided it is one having thermoplastic properties. For example, use may be made of homopolymer resins or copolymer resins such as polyolefin resins (e.g., polypropylene (PP), high-density polyethylene (HDPE), linear low-density polyethylene (LLDPE), low-density polyethylene (LDPE)), polyamide resins (e.g., polyamide 4, polyamide 6, polyamide 66, polyamide 610, polyamide 11, polyamide 12, aromatic polyamides), polyester resins (e.g., polyethylene terephthalate (PET), polybutylene terephthalate (PBT), polylactic acid), polycarbonate resins, polystyrene resins, acrylic resins, AS resins, ABS resins, PPS resins and POM resins, or of resin blends in which two or more of the foregoing types are used in combination. When the thermoplastic resin is selected for use from among the above, it may be selected as desired while taking into account the required properties of the natural fiber-reinforced thermoplastic resin injection moldings.

In the present invention wherein natural fibers are used as the reinforcing fibers, upon exposure to elevated temperatures during injection molding, these natural fibers undergo thermal decomposition or thermal deterioration, as a result of which the desired static electricity discharging ability is not obtained and the functionality as a reinforcing material is sometimes compromised. Thus, it is desirable to select a thermoplastic resin which has a melting or softening temperature of preferably not more than about 220° C., more preferably not more than about 200° C., and even more preferably not more than about 180° C.

Out of the above thermoplastic resins, taking into consideration the balance between the physical properties, cost and other attributes of the injection moldings, especially preferred thermoplastic resins are polyolefin resins (polypropylene (PP), high-density polyethylene (HDPE), linear low-density polyethylene (LLDPE), low-density polyethylene (LDPE), α-olefins such as 1-butene, 1-hexene or 1-octene, or copolymers thereof), modified polyolefin resins obtained by modifying such polyolefin resins with an unsaturated carboxylic acid or a derivative thereof, polylactic acids, ethylene-vinyl acetate resins (EVA), or resin blends of two or more types thereof.

Illustrative examples of the unsaturated carboxylic acid or a derivative thereof that may be used for modification include acrylic acid, methacrylic acid, maleic acid, itaconic acid, fumaric acid and esters of these acids, maleic anhydride and itaconic anhydride. Out of these, maleic anhydride and methacrylic acid glycidyl ester are especially preferred.

To improve adhesion between these thermoplastic resins and the natural fibers, it is possible to use concomitant being made of various modified resins having good adhesion with respect to both natural fibers and thermoplastic resins, within a range that does not interfere with manifestation of the desired static electricity discharging ability. Examples of modified resins that are effective for polyolefin resins such as polypropylene include maleic anhydride-modified polyolefins, oxazoline-modified polyolefins and methacrylic acid glycidyl ester-modified polyolefins. To use these concomitant in a suitable amount enables the mechanical properties of the injection moldings to be even further increased. These modified polyolefin resins are preferably added in an amount, based on the polyolefin resin, of from 0.1 to 15 wt % (mass %), more preferably from 0.2 to 12 wt %, and most preferably from 0.5 to 10 wt %.

Inorganic fillers and various types of additives may be added to the thermoplastic resin according to the intended use of the injection moldings and other desired properties, within a range that does not interfere with the manifestation of the desired static electricity discharging ability. Illustrative examples of inorganic fillers include talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide and zinc sulfate. These may be added singly or, if necessary, may be added in combinations of two or more. Illustrative examples of such additives include dispersants, lubricants, thickeners, flame retardants, antioxidants, light stabilizers, ultraviolet absorbers, crystallization promoters (nucleating agents), plasticizers, pigments and dyes. If necessary, these may be used as combinations of two or more thereof.

Next, a method of manufacturing natural fiber-reinforced thermoplastic resin pellets (also referred to below as simply "natural fiber-reinforced resin pellets") according to the present invention is described. The subsequently described pultrusion process by means of which long fiber-reinforced rein pellets can be obtained is desirable as the method of manufacturing natural fiber-reinforced resin pellets. This is because, along with being able to achieve the excellent static electricity discharging ability of the injection molding, such a method is superior in terms of manufacturability and production costs. However, use may also be made of other methods, such as a method in which a twin-screw kneading extruder is charged with natural fibers that have been cut to a given length and with thermoplastic resin pellets, the thermoplastic resin is melted and kneaded together with the natural fibers, the resulting blend is extruded, and the cooled and solidified extrudate is cut to a given length. With such a method, unlike the pultrusion process, short fiber-reinforced resin pellets can be obtained.

A method of producing natural fiber-reinforced resin pellets by the pultrusion process is described below. FIG. 1 is schematic diagram showing an example of an apparatus for producing natural fiber-reinforced thermoplastic resin pellets according to the present invention by a pultrusion process.

FIG. 1 shows natural fiber spun yarns (reinforcing fibers) 1 obtained by spinning non-continuous natural fibers into a yarn. A natural fiber spun yarn bundle (reinforcing fiber bundle) 2 composed of a plurality of natural fiber spun yarns 1 that have been unspooled from respective bobbins 5 is guided into an impregnation head (impregnation die) 8. An extruder 6 having a screw 7 at the interior and the impregnation head (molten resin bath vessel) 8 into which a molten resin (melted thermoplastic resin) 3 is continuously fed from this extruder 6 and into which the natural fiber spun yarn bundle 2 is guided are provided on the downstream side of the bobbins 5. A plurality of impregnating rollers 9 for impregnating the molten resin 3 into the continuously introduced natural fiber spun yarn bundle 2 are disposed at the interior of the impregnation head 8. A die (die nozzle) 10 for defining the diameter of a strand 4 of circular cross-sectional shape composed of the resin-impregnated natural fiber spun yarn bundle (fiber-impregnated reinforcing fiber bundle) pulled from the impregnating head 8 in a twist-imparted state is mounted at an outlet of the impregnation head 8.

A cooling unit 11 for cooling in water the strand 4 that has been pulled out of the impregnation head 8 is provided on the downstream side of the impregnation head 8 on which the die 10 has been mounted. A twister 12 having the function of imparting twist to the resin-impregnated natural fiber spun yarn bundle and the function of taking up the strand 4 from the upstream side is provided immediately downstream from this cooling unit 11. In addition, a pelletizer 14 which cuts the strand 4 to a given length and thereby forms it into pellets is provided on the downstream side of the twister 12.

The twister 12 is composed of a pair of twisting rollers 13A and 13B. The twisting rollers 13A and 13B are each arranged on a parallel flat surface (horizontal surface), have respective axes of rotation which mutually intersect as seen from a direction perpendicular to the respective flat surfaces, and are disposed opposite each other on either side of the strand 4. Specifically, the axis of rotation of the upper side twisting roller 13A and the axis of rotation of the downside twisting roller 13B in FIG. 1 are set in directions which are not perpendicular to the take-up direction (direction of travel) of the strand 4, but rather, in a plan view, form the same given angle of offset from the take-up direction in mutually opposing directions. Twist is applied to the resin-impregnated natural fiber spun yarn bundle by these twisting rollers 13A and 13B, and the resin-impregnated natural fiber spun yarn bundle (strand) to which such twist has been applied is taken up.

In a manufacturing apparatus configured in this way, first, the natural fiber spun yarn bundle 2 is guided into the impregnation head 8. Next, this natural fiber spun yarn bundle 2 advances along each of the impregnating rollers 9 through the interior of the impregnation head 8 filled with high-temperature molten resin 3 fed from an extruder 6. As the natural fiber spun yarn bundle 2 advances through the impregnation head 8, it is impregnated with resin, resulting in the formation of a resin-impregnated natural fiber spun yarn bundle. The twisting action by the twisting rollers 13A and 13B imparts twist to this resin-impregnated natural fiber spun yarn bundle between these twisting rollers 13A and 13B and the downstream-side impregnating roller 9 within the impregnation head 8. In this way, as the natural fiber spun yarn bundle 2 is being impregnated with molten resin 3, twist is applied to the resin-impregnated natural fiber spun yarn bundle and a strand 4 composed of the resin-impregnated natural fiber spun yarn bundle to which twist has been applied is taken up continuously from the impregnation head 8.

The strand 4 that is taken up continuously through the die 10 from the impregnating head 8 is cooled and hardened by a cooling unit 11, then guided to the twisting rollers 13A and 13B which carry out a twisting action and take-up. Next, the strand 4 of circular cross-sectional shape which has been guided to the downstream side of the twister 12 is cut to a given length with a pelletizer 14, thereby natural fiber-reinforcing resin pellets are formed.

The impregnation of molten resin into the natural fiber spun yarn bundle is promoted by applying twist to the resin-impregnated natural fiber spun yarn bundle while impregnating the natural fiber spun yarn bundle with molten resin in such a pultrusion process, as a result, the resin-impregnated natural fiber spun yarn bundle in a good impregnated state is obtained. The injection moldability (fiber dispersibility, etc.) of the natural fiber-reinforced resin pellets obtained by pultrusion is thus enhanced, as a result of which a good static electricity discharging ability is obtained in the injection moldings. Here, the amount of twist applied to the strand may be set while taking into account the ease of operation and handling, the productivity in pellet production. The twist pitch may be within a range of from 10 to 200 turns per meter (T/m). At a twist pitch below 10 T/m, the increase in tension achieved by the application of twist is insufficient, in addition to which short fibers that have separated from the spun yarn enter into the molten resin bath to adhere to the pellets or to impregnate the pellets, which tends to give rise to a variation in the ability of the injection molding to discharge static electricity. On the other hand, when the amount of twist is greater than 200 T/m, which is excessive, the impregnation of molten resin into the natural fiber spun yarn bundle becomes insufficient, as a result of leaving un-impregnated areas in the pellets. In such cases, the natural fibers are not sufficiently dispersed within the injection molding, as a result of which the injection moldings fail to exhibit an satisfactory static electricity discharging ability. Moreover, in cases where the dispersion of natural fibers in the injection molding is insufficient, because the natural fibers tend to emerge at the surface of the injection molding, it is impossible to obtain a good appearance.

A natural fiber spun yarn obtained by spinning non-continuous natural fibers into a yarn can have "Z twist" or "S twist"; out of these, natural fiber spun yarn having Z twist is generally used. In obtaining natural fiber-reinforced resin pellets according to the present invention, if the direction of twist applied to a natural fiber spun yarn by a twisting roller is the S twist direction with respect to, for example, a Z-twist natural fiber spun yarn, the twist of the natural fiber spun yarn will be undone somewhat in the impregnation step within the impregnation head. This will enable more effective impregnation of the molten resin, the static electricity discharging ability of the injection molding is further increased.

The natural fiber-reinforced resin injection molding according to the present invention must have a natural fiber content rate within the injection molding (weight ratio of natural fibers present in the molding relative to a total weight of the injection molding) which is at least 20 wt % but not more than 60 wt %. If a natural fiber content rate in the molding is less than 20 wt %, there are too few natural fibers. Thus the specific volume resistance of the infection molding tends to become large, it is difficult to exhibit a sufficient static electricity discharging ability or to make local variations in the static electricity discharging ability become large. On the other hand, if a natural fiber content is more than 60 wt %, the flowability of the natural fiber-reinforced resin decreases, so that a injection moldability become poor, the natural fibers are not fully dispersed within the molding (leaving behind un-impregnated areas) and the natural fibers tend to emerge at the surface of the moldings, all of which makes it difficult to obtain injection moldings having a good appearance and a good static electricity discharging ability.

The natural fibers in the injection molding have an average length which must satisfy a range of at least 1.5 mm but not more than 4.0 mm. If the natural fibers present in the injection molding have an average length of less than 1.5 mm, entanglements (points of contact) between the fibers within the molding decrease and the specific volume resistance of the injection molding becomes larger, as a result of which the injection molding does not exhibit a sufficient static electricity discharging ability. On the other hand, if a natural fiber average length is more than 4.0 mm, the injection moldability worsens, the natural fibers are not sufficiently dispersed within the molding (leaving behind un-impregnated areas) and the natural fibers tend to emerge at the surface of the molding, all of which makes it difficult to obtain injection moldings having a good appearance and a good ability to discharge static electricity.

The length of the fibers remaining in the final molded product may vary depending on the molding method and the molding conditions. This is because the level of fiber breakage varies depending on the molding method and the molding conditions. Hence, the average length of the fibers must be set so as to fall within the desired range by adjusting the length of the starting fibers and the molding conditions in accordance with the molding method.

The actual steps are generally as follows.

When a material having intrinsically a short length such as bamboo fibers is used, fibers within a predetermined fiber length range are obtained by carrying out grinding or screening, or both of these operations, then natural fiber-reinforced resin pellets is formed by mixing the resulting fibers with the resin. A first breakage arises in the course of such mixing. A second breakage arises when these natural fiber-reinforced resin pellets are injection-molded. Accordingly, the fiber length range obtained by grinding or screening, or both of these operations, is set, while making allowance for the first and second breakages, in such a way that the average fiber length falls within the desired range after injection molding.

When a material having intrinsically a long length such as jute is used, the length of the natural fiber-reinforced resin pellets and the fiber length are substantially the same. Here, the length of the actual pellets is from 6 mm to 12 mm. Fiber breakage occurs in the course of injection-molding these natural fiber-reinforced resin pellets. The molding method and molding conditions are adjusted so that the average length of the fiber in the moldings falls within the desired range by such breakage.

The injection molding method used to obtain the natural fiber-reinforced resin injection molding according to the invention from natural fiber-reinforced resin pellets is not subject to any particular limitation so long as moldings which satisfy the above-described conditions can be obtained. That is, natural fiber-reinforced resins pellets containing at least 20 wt % but not more than 60 wt % of natural fibers may be directly injection molded as the molding feedstock by a conventional method. Alternatively, a masterbatch process may be employed in which pellets having a higher natural fiber content are initially produced, then injection molding is carried out with the initial pellets while they are diluted with resin pellets made of the same material as the matrix resin used in the initial fiber-containing pellets so as to form moldings having a predetermined natural fiber content.

Thus, by having the natural fiber content in a molding falling within a range of at least 20 wt % but not more than 60 wt % and the average length of the natural fibers falling within a range of at least 1.5 mm but not more than 4.0 mm, and by adjusting the electrostatic voltage half-life, as determined by the half-life measurement method specified in JIS L 1094 (Methods for Testing the Electrostatic Properties of Woven and Knit Fabrics) to less than 40 seconds, natural fiber-reinforced resin injection moldings which have an excellent ability to discharge static electricity can be obtained.

That is, to obtain the target static electricity discharging ability, it is necessary to set the electrostatic voltage half-life, as determined by the half-life measurement method specified in JIS L 1094 (Methods for Testing the Electrostatic Properties of Woven and Knit Fabrics) to less than 40 seconds. Achieving this requires that, at a natural fiber content within the molding in a range of at least 20 wt % but not more than 60 wt % and at an average length of the natural fibers in a range of at least 1.5 mm but not more than 4.0 mm, the content of natural fibers within the molding and the average length of the natural fibers be further adjusted so as to achieve such an electrostatic voltage half-life. The included substances and moisture content of the natural fibers differ also according to the type of the natural fiber and the production conditions. Therefore, the range in the natural fiber content within the molding and the range in the average length of the natural fibers for achieving an electrostatic voltage half-life of less than 40 seconds are determined according to the type of natural fibers used and the production conditions, and thus cannot be strictly defined. Also, it is difficult in practice to separate the conditions in detail and to specify the natural fiber content within the molding and the average length of the natural fibers. Hence, the condition of "an electrostatic voltage half-life, as determined by the half-life measurement method specified in JIS L 1094 (Methods for Testing the Electrostatic Properties of Woven and Knit Fabrics), of less than 40 seconds" is prescribed.

The half-life measurement method specified in JIS L 1094 is a method in which a test piece of a specific shape is electrostatically charged in a corona discharge field, following which the time (half-life) until the charge decays to one-half this initial electrostatic charge (initial potential) is measured. Moreover, the half-life measurement method specified in JIS L 1094 has been stipulated as the method for testing the electrostatic decay properties of woven and knit fabrics, and also is generally used as a method for evaluating the static electricity discharging properties of plastics that readily charge static electricity.

Examples

Natural fiber-reinforced resin injection moldings having different types of natural fibers, natural fiber contents and natural fiber average lengths were produced, and their electrostatic half-lives were measured.

Thermoplastic Resin

Two types of thermoplastic resin were used: Y and Z. Thermoplastic resin Y was polypropylene (BD05G, produced by Japan Polypropylene Corporation), with which maleic acid-modified polypropylene (Youmex 1001, produced by Sanyo Chemical Industries, Ltd.) was blended in a weight ratio of 5%. The above maleic acid-modified polypropylene was used to enhance the interfacial adhesion between the resin and the natural fibers and improve impregnation. Thermoplastic resin Z was polylactic acid (Lacea H-100J, produced by Mitsui Chemicals, Inc.).

Reinforcing Fibers

Two types of natural fibers were used as reinforcing fibers: J and B. Natural fiber J was jute spun yarn (K16.5 (bleached), produced by Tesac). Natural fiber B was bamboo fiber, of which B-1 had an average fiber diameter of 90 μm and an average fiber length of 20 mm, and B-2 had an average fiber diameter of 90 μm and an average fiber length of 5 mm. These bamboo fibers are bamboo materials from Indonesia, and were produced via the steps in which a drying step, a blasting step, a grinding step and a screening step are carried out in series.

Methods of Manufacturing Natural Fiber-Reinforced Resin Pellets

Pultrusion: Pellets (pellet diameter, 3.0 mm; pellet length, 8 mm) were produced by the above-described pultrusion process. Extrusion: While melting the thermoplastic resin in a twin-screw kneading extruder, a suitable amount of bamboo fibers was fed in through a side feeder. The two materials were kneaded together and extruded by the twin-screw kneading extruder, then cooled and cut into pellets (pellet diameter, 4.0 mm; pellet length, 5 mm).

Natural Fiber-Reinforced Resin Injection Moldings

Using the various pellets shown in Table 1 as the molding feedstock in the respective examples, injection moldings shaped as flat plates having a length of 200 mm, a width of 100 mm and a thickness of 4 mm were manufactured with an injection molding machine having a mold clamping force of 100 tons.

Measurement of Electrostatic Voltage Half-Life

A test piece which was square 50 mm on a side was cut from the center of each of the above flat plate-like injection moldings, and the electrostatic voltage half-life was measured in accordance with the half-life measurement method specified in JIS L 1094 (electrostatic voltage half-life measuring apparatus: manufactured by Nippon Static Co., Ltd.). That is, the electrostatic voltage half-life was measured using a half-life measurement apparatus equipped with a turntable which is capable of immobilizing a test piece and capable of rotating the immobilized test piece, and with an electrostatic charge probe and an electrostatic voltage measurement probe which are disposed at two points on either side of the center of the turntable on the turntable diameter. Using the principle of corona charging with a needle electrode, the apparatus electrostatically charges the test piece while the test piece passes below the electrostatic charge probe, then moves the test piece through a half-rotation and passes the test piece under the measurement probe. Specifically, the test piece was charged for 30 seconds at a charging voltage of 10 kV, following which the time until the potential decayed to one-half the initial potential (the half-time) was measured. The test temperature was 23° C., and the test humidity was 50%. The measurement results are shown in Table 1.

Measurement of Average Fiber Length

The resin in a molding was dissolved with a solvent and, by examining the remaining fibers under a microscope, the lengths of each of a sufficiently large number of fibers was measured. The average of the fiber lengths thus obtained was computed and used as the average fiber length.

TABLE 1

| EXAMPLES | FEEDSTOCK PELLETS | | | MOLDINGS AVERAGE FIBER LENGTH (AVERAGE LENGTH OF REMAINING FIBERS) (mm) | METHOD OF PRODUCING PELLETS | ELECTROSTATIC VOLTAGE HALF-LIFE (s) | |
|---|---|---|---|---|---|---|---|
| | RESIN | REINFORCING FIBERS | FIBER CONTENT (wt %) | | | APPLIED VOLTAGE: +10 kV | APPLIED VOLTAGE: −10 kV |
| WORKING EXAMPLE 1 | Y | J | 60 | 3.8 | PULTRUSION | 0.7 | 0.6 |
| WORKING EXAMPLE 2 | Y | J | 55 | 2.5 | PULTRUSION | 14 | 10 |
| WORKING EXAMPLE 3 | Y | J | 20 | 2.8 | PULTRUSION | 6.7 | 4.7 |
| WORKING EXAMPLE 4 | Y | B-1 | 50 | 1.6 | EXTRUSION | 14 | 11 |
| WORKING EXAMPLE 5 | Z | J | 50 | 2.5 | PULTRUSION | 33 | 31 |
| COMPARATIVE EXAMPLE 1 | Y | NONE | — | — | — | ≧40 | ≧40 |
| COMPARATIVE EXAMPLE 2 | Y | J | 55 | 1.2 | PULTRUSION | ≧40 | ≧40 |
| COMPARATIVE EXAMPLE 3 | Y | J | 15 | 2.4 | PULTRUSION | ≧40 | ≧40 |
| COMPARATIVE EXAMPLE 4 | Y | J | 65 | 2.6 | PULTRUSION | ≧40 | ≧40 |
| COMPARATIVE EXAMPLE 5 | Y | B-2 | 50 | 0.7 | EXTRUSION | ≧40 | ≧40 |
| COMPARATIVE EXAMPLE 6 | Z | J | 63 | 2.3 | PULTRUSION | ≧40 | ≧40 |

Comparative Example 1 was composed only of thermoplastic resin, and had an electrostatic voltage half-life of 40 seconds or more (meaning that the electrostatic voltage did not fall to one-half the initial electrostatic voltage even after at least 40 seconds had elapsed). In Comparative Examples 2 and 5, the average fiber length in the molding (average length of remaining fibers) was below the lower limit value specified in the present invention and the electrostatic voltage half-life was 40 seconds or more (meaning that the electrostatic voltage did not fall to one-half the initial electrostatic voltage even after at least 40 seconds had elapsed), indicating a poor ability to discharge static electricity. In Comparative Example 3, the content of natural fibers in the molding was below the lower limit value specified in the present invention and the electrostatic voltage half-life was 40 seconds or more (meaning that the electrostatic voltage did not fall to one-half the initial electrostatic voltage even after at least 40 seconds had elapsed), indicating a poor ability to discharge static electricity. In Comparative Examples 4 and 6, the content of natural fibers in the molding exceeded the upper limit value specified in the present invention. As a result, there were areas in the molding in which the resin was not impregnated, or natural fibers emerged on the surface of the molding. Thus, the electrostatic voltage half-life was 40 seconds or more (meaning that the electrostatic voltage did not fall to one-half the initial electrostatic voltage even after at least 40 seconds had elapsed), indicating a poor ability to discharge static electricity.

By contrast, in each of Working Examples 1 to 5, the electrostatic voltage half-life was less than 40 seconds, indicating an excellent ability to discharge static electricity.

The above embodiments primarily include an invention having the following features.

The present invention provides a natural fiber-reinforced thermoplastic resin injection molding which is obtained by injection molding with using natural fiber-reinforced thermoplastic resin pellets as a molding feedstock containing natural fibers as reinforcing fibers. The molding has a natural fiber content of at least 20 wt % but not more than 60 wt %, and the natural fibers in the molding have an average length of at least 1.5 mm but not more than 4.0 mm. The molding has an electrostatic voltage half-life, as determined by the half-life measurement method specified in JIS L 1094, of less than 40 seconds.

This invention makes it possible to obtain natural fiber-reinforced thermoplastic resin injection moldings produced by injection-molding with using natural fiber-reinforced thermoplastic resin pellets as the molding feedstock containing natural fibers as the reinforcing fibers, which moldings have an excellent ability to discharge static electricity.

In the foregoing natural fiber-reinforced thermoplastic resin injection molding, it is preferable for the natural fibers to be of one or two types selected from among hemp fibers and bamboo fibers.

INDUSTRIAL APPLICABILITY

The present invention enables natural fiber-reinforced thermoplastic resin injection moldings having an excellent ability to discharge static electricity to be obtained, which moldings are obtained by injection molding with using natural fiber-reinforced thermoplastic resin pellets as a molding feedstock containing natural fibers as reinforcing fibers.

The invention claimed is:

1. A natural fiber-reinforced thermoplastic resin injection molding which is obtained by injection-molding with using natural fiber-reinforced thermoplastic resin pellets as a molding feedstock containing natural fibers as reinforcing fibers,
    wherein the molding has a natural fiber content of at least 20 wt % but not more than 60 wt %, and the natural fibers in the molding have an average length of at least 1.5 mm but not more than 4.0 mm, and
    wherein the natural fiber content and the average length are adjusted such that the molding has an electrostatic voltage half-life, as determined by the half-life measurement method specified in JIS L 1094, of less than 40 seconds, at the natural fiber content in a range of at least 20 wt % but not more than 60 wt % and at the average length of at least 1.5 mm but not more than 4.0 mm.

2. The natural fiber-reinforced thermoplastic resin injection molding according to claim 1, wherein the natural fibers are of one or two types selected from among hemp fibers and bamboo fibers.

* * * * *